(12) United States Patent
Boo

(10) Patent No.: US 12,173,763 B2
(45) Date of Patent: Dec. 24, 2024

(54) BRAKING DEVICE FOR IN-WHEEL MOTOR

(71) Applicant: HYUNDAI MOBIS Co., Ltd., Seoul (KR)

(72) Inventor: Sang Pil Boo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 331 days.

(21) Appl. No.: 17/829,865

(22) Filed: Jun. 1, 2022

(65) Prior Publication Data

US 2023/0167864 A1 Jun. 1, 2023

(30) Foreign Application Priority Data

Nov. 26, 2021 (KR) .................. 10-2021-0165351

(51) Int. Cl.
| | |
|---|---|
| F16D 65/18 | (2006.01) |
| B60K 7/00 | (2006.01) |
| F16D 55/226 | (2006.01) |
| F16D 65/00 | (2006.01) |
| F16D 65/095 | (2006.01) |
| H02K 7/102 | (2006.01) |
| F16D 55/00 | (2006.01) |
| F16D 121/04 | (2012.01) |
| F16D 125/06 | (2012.01) |

(52) U.S. Cl.
CPC ........ F16D 65/0068 (2013.01); B60K 7/0007 (2013.01); F16D 55/226 (2013.01); F16D 65/0056 (2013.01); F16D 65/095 (2013.01); F16D 65/18 (2013.01); H02K 7/102 (2013.01); *F16D 2055/0008* (2013.01); *F16D 2055/0016* (2013.01); *F16D 2121/04* (2013.01); *F16D 2125/06* (2013.01)

(58) Field of Classification Search
CPC ............... F16D 55/226; F16D 65/0056; F16D 65/0068; F16D 65/095; F16D 65/18; F16D 2055/0008; F16D 2055/0016; F16D 2121/04; F16D 2125/06; H02K 7/102
USPC ..................... 180/65.51, 65.6, 65.7; 301/6.5; 188/156–164
See application file for complete search history.

(56) References Cited

U.S. PATENT DOCUMENTS

| | | | | |
|---|---|---|---|---|
| 10,118,479 | B2 * | 11/2018 | Igi | F16D 55/2265 |
| 2008/0053719 | A1 * | 3/2008 | Yoshino | F16D 65/12 |
| | | | | 188/72.1 |

(Continued)

FOREIGN PATENT DOCUMENTS

| | | | |
|---|---|---|---|
| DE | 102009035176 A1 | 2/2011 | |
| JP | 2008-126733 A | 6/2008 | |
| KR | 101004598 B1 * | 12/2010 | ............... H02K 7/10 |

(Continued)

OTHER PUBLICATIONS

Office Action issued May 16, 2023 for corresponding German Patent Application No. 102022116572.8.

(Continued)

*Primary Examiner* — Christopher P Schwartz
(74) *Attorney, Agent, or Firm* — Morgan, Lewis & Bockius LLP

(57) ABSTRACT

A braking device for an in-wheel motor may include: a stator; a rotor configured to rotate when power is applied to the stator; a disk interlocked with the rotor; a bracket coupled to the stator and a knuckle; and a caliper mounted on the bracket, and configured to press the disk.

10 Claims, 9 Drawing Sheets

(56) References Cited

U.S. PATENT DOCUMENTS

2008/0070736 A1* 3/2008 Yoshino ............... B60K 7/0007
                                                                               301/6.5
2012/0248850 A1 10/2012 Hirano

FOREIGN PATENT DOCUMENTS

| KR | 10-2020-0092776 A | 8/2020 | |
| WO | WO-2013141427 A1 * | 9/2013 | ........... B60K 17/046 |

OTHER PUBLICATIONS

Office Action issued in corresponding Korean Patent Application No. 10-2021-0165351 dated Nov. 10, 2023.

\* cited by examiner

BRAKING DEVICE FOR IN-WHEEL MOTOR

CROSS-REFERENCE TO RELATED APPLICATION

This application claims priority from and the benefit of Korean Patent Application No. 10-2021-0165351, filed on Nov. 26, 2021, which is hereby incorporated by reference for all purposes as if set forth herein.

BACKGROUND

Field

Exemplary embodiments of the present disclosure relate to a braking device for an in-wheel motor, and more particularly, to a braking device for an in-wheel motor, which has a caliper mounted on a bracket mounted in a wheel, and thus can suppress the caliper from generating rotational moment during braking, and in which the caliper can be reduced in size in order to reduce the weight of the vehicle.

Discussion of the Background

In general, an in-wheel motor is used for transportation means which use electricity as a power source. The in-wheel motor is installed inside a rim and outputs power, and the power is directly transferred to a wheel such that the rim and the wheel are rotated. Such an in-wheel motor includes a tire, the rim, a stator, a rotor, and a shaft.

The tire is coupled to the rim while covering the outer circumference of the rim. The stator and the rotor constitute a motor assembly. The motor assembly is provided inside the rim. The shaft is fixed to the center of the stator. The stator receives power from the outside. For this operation, a lead line for supplying power is connected to the stator through the center of the shaft.

The stator of the in-wheel motor receives power through the lead line, and the rotor rotates when the power is applied to the stator. As a result, the rim rotates the tire while rotating with the rotor.

In the conventional in-wheel motor, however, a gear box, a motor assembly, and an ECU are mounted on a rear surface of an electric caliper which drives a pad to be pressed against the disk. Thus, the gravity center of an electric caliper module is moved backward, such that rotational moment is generated during an operation process. Furthermore, the conventional bracketless caliper generates rotational moment due to a height difference between an operation line and a fixing part coupled to a knuckle. Furthermore, since a torque member for housing the pad is mounted on the conventional caliper, it is difficult to dispose the caliper in the wheel. Finally, in the conventional caliper, runout is measured for each assembly unit of a knuckle and a disk. In this case, since the caliper is freely placed over the in-wheel motor and a knuckle on which the caliper is mounted is not included, it is impossible to measure runout in units of chassis modules. Thus, there is a demand for a device capable of solving such problems.

The related art of the present disclosure is disclosed in Korean Patent Application Publication No. 2020-0092776 published on Aug. 4, 2020 and entitled "Brake Device of In-Wheel Motor and In-Wheel Motor Having the Same".

SUMMARY

Various embodiments are directed to a braking device for an in-wheel motor, which has a caliper mounted on a bracket mounted in a wheel, and thus can suppress the caliper from generating rotational moment during braking, and in which the caliper can be reduced in size in order to reduce the weight of the vehicle.

In an embodiment, a braking device for an in-wheel motor may include: a stator; a rotor configured to rotate when power is applied to the stator; a disk interlocked with the rotor; a bracket coupled to the stator and a knuckle; and a caliper mounted on the bracket, and configured to press the disk.

The bracket may include: a body part to which the knuckle is coupled; one or more extension parts extending from the body part, and coupled to the stator; and a mounting part disposed on the body part, and having the caliper coupled thereto.

The mounting part may include: a pair of mounting plates disposed on the body part, and spaced apart from each other while facing each other; and a mounting hole formed in each of the pair of mounting plates, and configured to induce a coupling of the caliper.

The mounting part may further include a mounting guide formed on each of the pair of mounting plates, and configured to guide linear movement of the caliper.

Each of the pair of mounting plates may be formed as one body with a respective one of the one or more extension parts.

The caliper may include: a caliper housing coupled to the bracket; a caliper driver mounted on the caliper housing, and configured to provide a driving force; a caliper piston embedded in the caliper housing, and moved by the caliper driver; a caliper inner pad moved by the caliper piston so as to press one surface of the disk; and a caliper outer pad mounted on the caliper housing, and configured to press another surface of the disk as the caliper housing is moved.

The caliper housing may include: a housing body part having the caliper piston embedded therein; a housing extension part extending from either side of the housing body part; and a housing support part configured to connect the housing extension part and the bracket and to induce sliding movement of the housing extension part.

The caliper driver may move the caliper piston through hydraulic pressure or an electric motor.

The caliper inner pad may be supported by the bracket.

The caliper outer pad may include: an outer plate part connected to the caliper housing; and an outer pad part assembled to the outer plate part, and configured to come into contact with the disk.

The caliper outer pad may further include an outer support part mounted on the stator and configured to support the outer plate part.

In the braking device for an in-wheel motor in accordance with the embodiment of the present disclosure, the knuckle is mounted on the central portion of the bracket, the edge of the bracket is coupled to the stator, and the caliper is mounted on the bracket. The caliper is partially supported by the bracket, which makes it possible to reduce the weight and size of the caliper.

Furthermore, when both sides of the caliper are mounted on the bracket, a height difference between a fixed line and an operation line of the caliper may be reduced to suppress the generation of rotational moment. Furthermore, since the caliper is mounted on the bracket, it is possible to measure runout in units of chassis modules.

DETAILED DESCRIPTION OF THE ILLUSTRATED EMBODIMENTS

Hereinafter, a braking device for an in-wheel motor will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
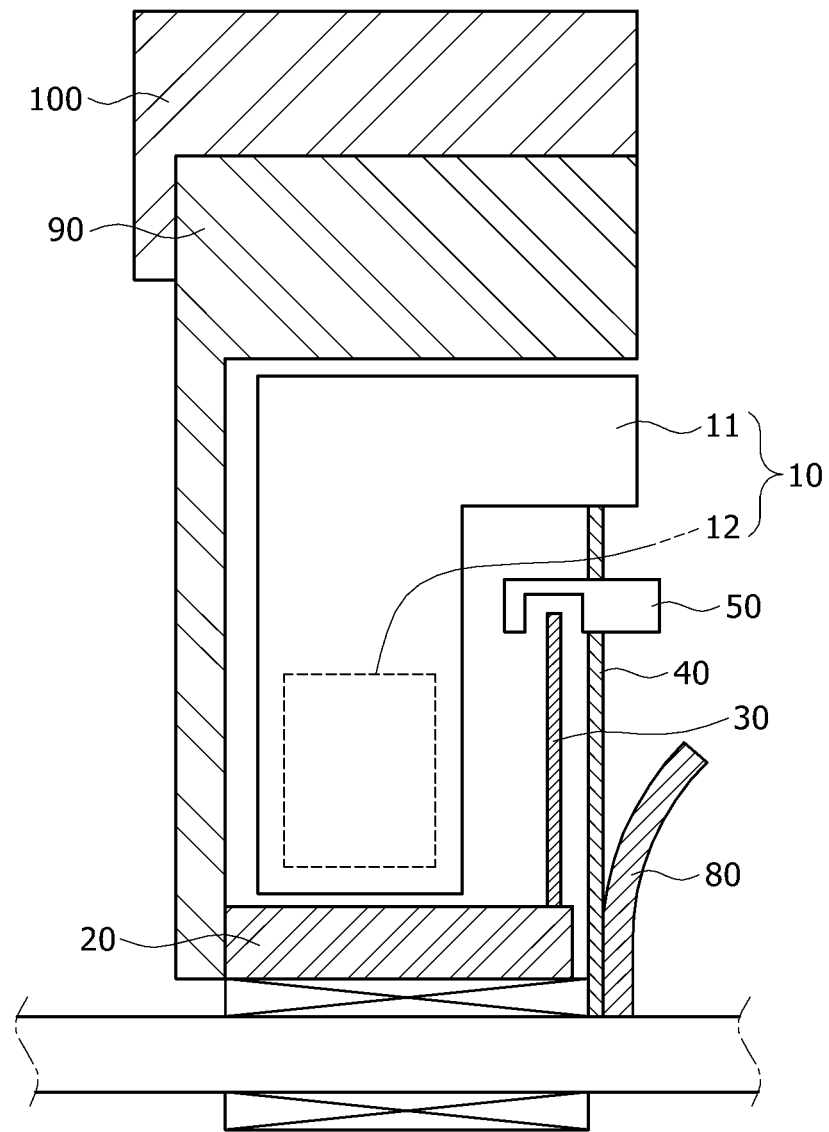
FIG. 1 is a cross-sectional view schematically illustrating a braking device for an in-wheel motor in accordance with an embodiment of the present disclosure.
Figure 2:
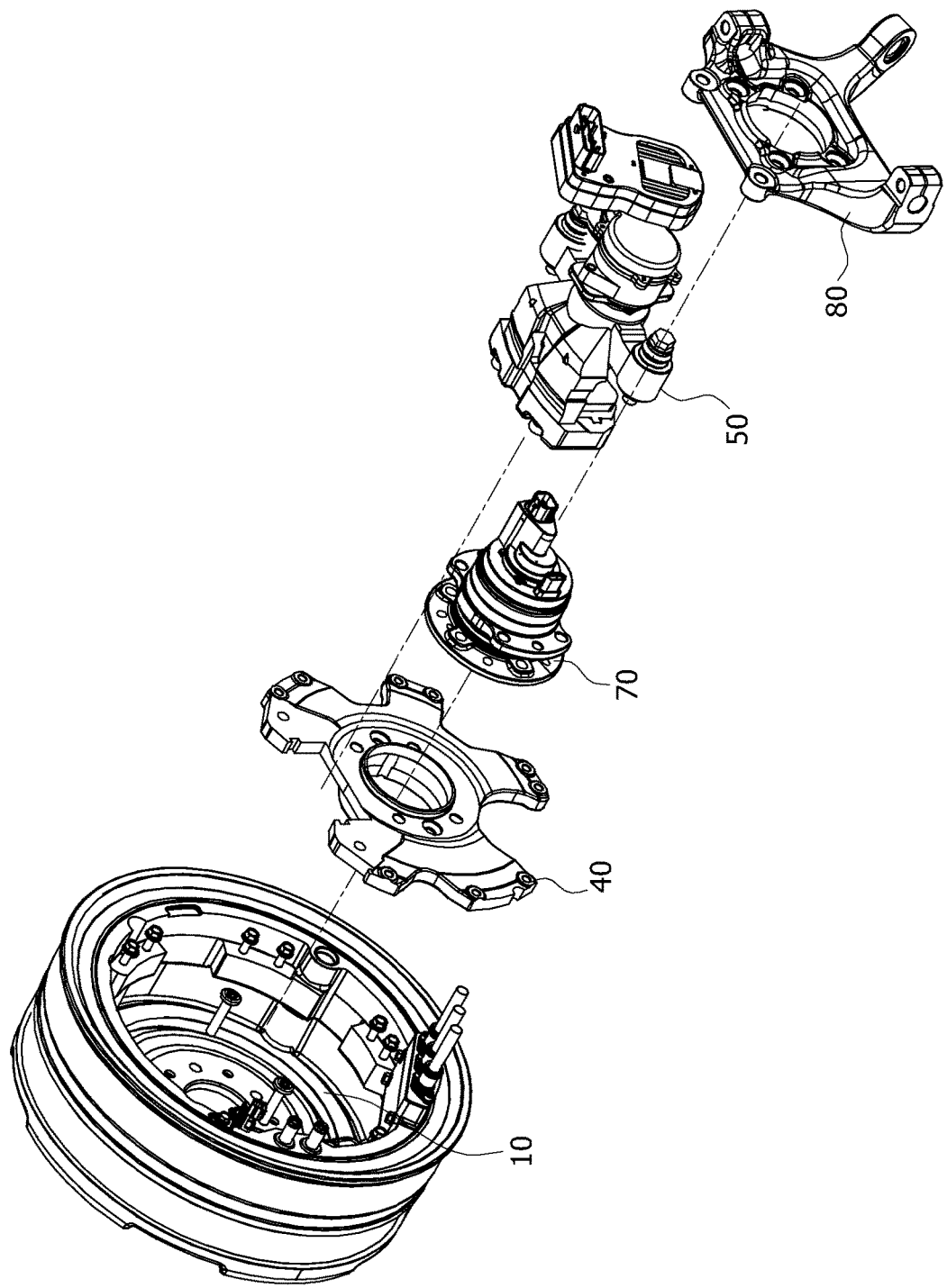
FIG. 2 is an exploded view schematically illustrating the braking device for an in-wheel motor in accordance with the embodiment of the present disclosure.

FIG. 1 is a cross-sectional view schematically illustrating a braking device for an in-wheel motor in accordance with an embodiment of the present disclosure, and FIG. 2 is an exploded view schematically illustrating the braking device for an in-wheel motor in accordance with the embodiment of the present disclosure. Referring to FIGS. 1 and 2, a braking device 1 for an in-wheel motor in accordance with an embodiment of the present disclosure includes a stator 10, a rotor 20, a disk 30, a bracket 40, and a caliper 50.

The stator 10 is disposed in a wheel part 90 which is rotated in connection with the rotor 20, and the wheel part 90 has a tire 100 mounted on the outside thereof. For example, the stator 10 may include an iron core for supporting coils and a frame for supporting the iron core. The stator 10 may include a case 11 and a stator 12. The case 11 may be coupled to the bracket 40. The stator 12 may be mounted or embedded in the case 11, disposed around the rotor 20 or cover the rotor 20, and rotate the rotor 20 when power is applied thereto.

The rotor 20 is disposed inside the stator 10, and rotated when power is applied to the stator 10. For example, the stator 10 may generate a rotating magnetic field by sequentially applying power to the respective coils, and the rotor 20 located through the stator 10 may be rotated along the rotating magnetic field. The wheel part 90 may be connected to and rotated by the rotor 20.

The disk 30 is interlocked with the rotor 20. For example, the inner circumferential surface of the disk 30 may be coupled to the outside of the rotor 20, and disposed between operation spaces of the caliper 50.

The bracket 40 is coupled to the stator 10 and a knuckle 80. For example, the knuckle 80 connected to a vehicle body may be mounted on the central portion of one surface of the bracket 40, and the edge of the bracket 40 may be coupled to the stator 10. Furthermore, a hub bearing part 70 capable of rotatably supporting the rotor 20 may be mounted on the central portion of the other surface of the bracket 40.

The caliper 50 is mounted on the bracket 40, and presses the disk 30. For example, the caliper 50 may be mounted on the bracket 40, and partially supported by the bracket 40 such that the size of the caliper 50 can be reduced. The disk 30 may be disposed between the operation spaces of the caliper 50. When the caliper 50 is operated according to a brake pedal operation signal, the caliper 50 may be pressed against the disk 30, thereby providing a braking force.

Figure 3:
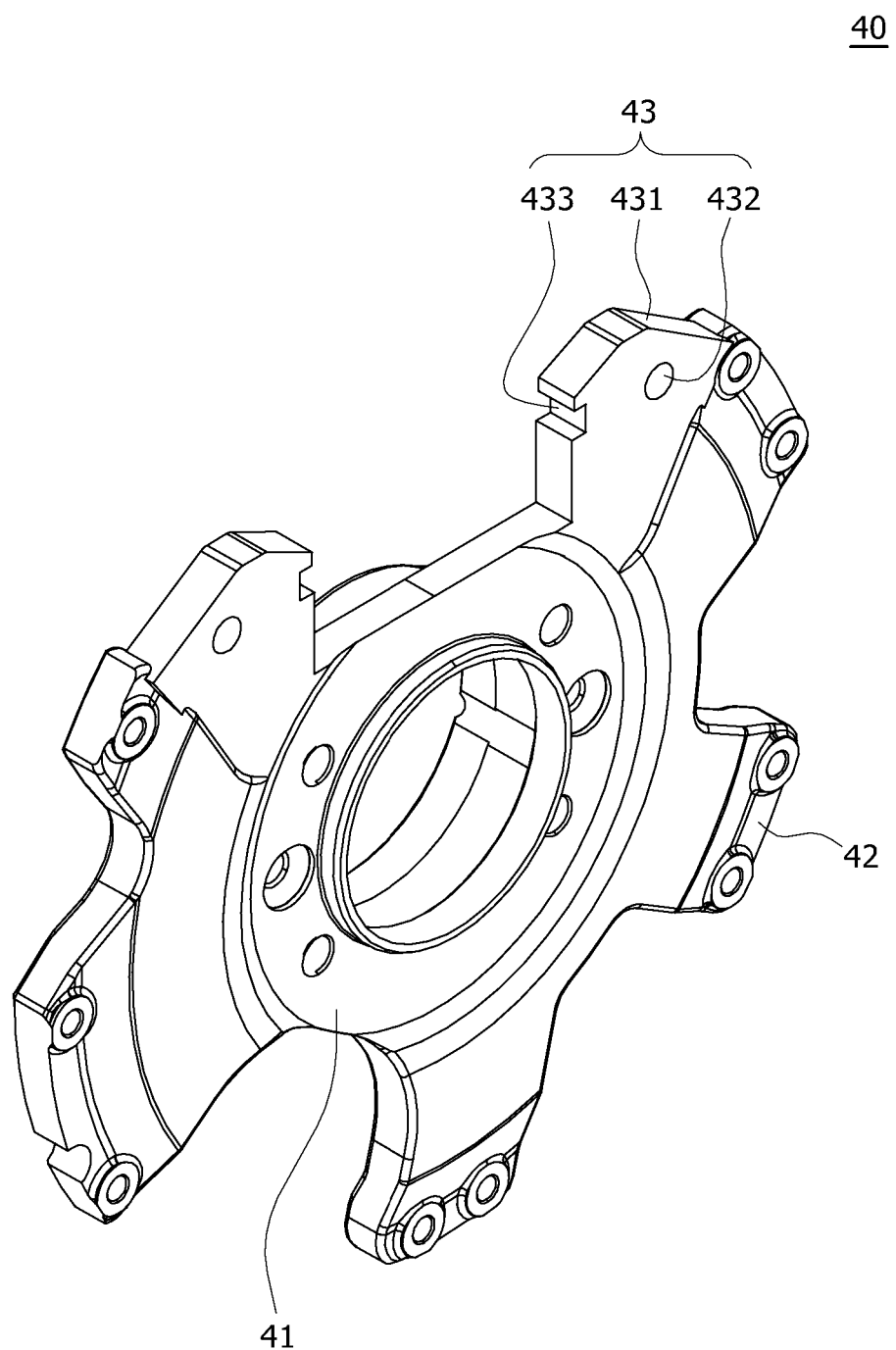
FIG. 3 is a diagram schematically illustrating a bracket in accordance with the embodiment of the present disclosure.
Figure 4:
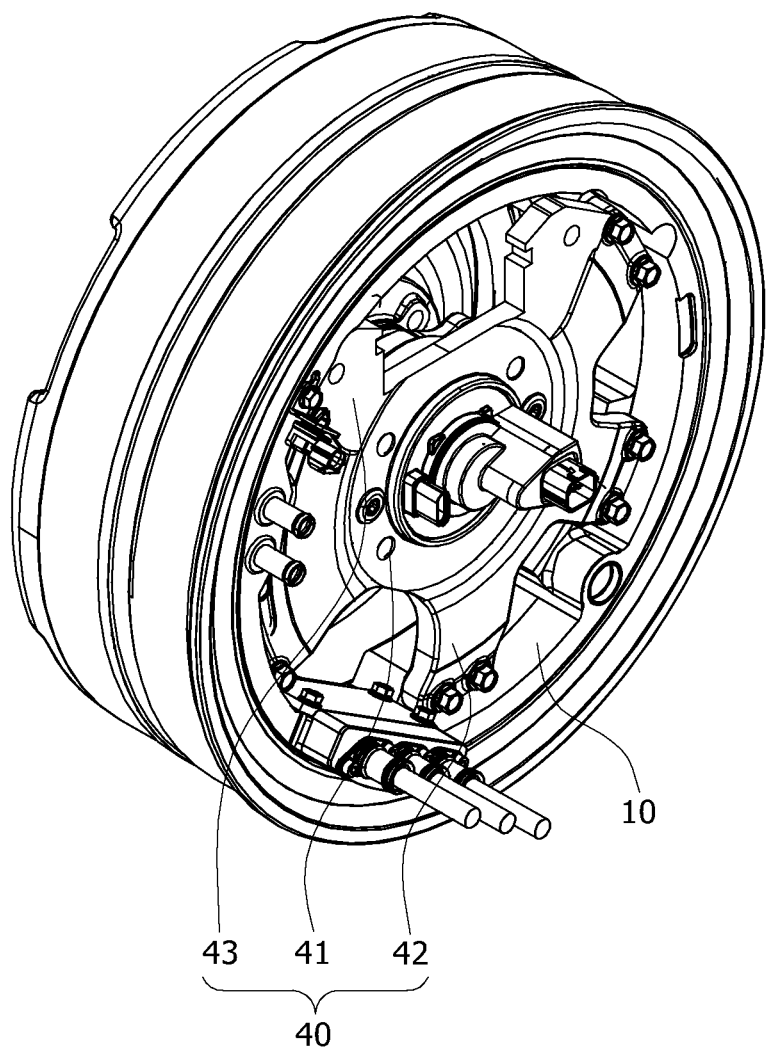
FIG. 4 is a diagram schematically illustrating that the bracket and a stator in accordance with the embodiment of the present disclosure are coupled to each other.
Figure 5:
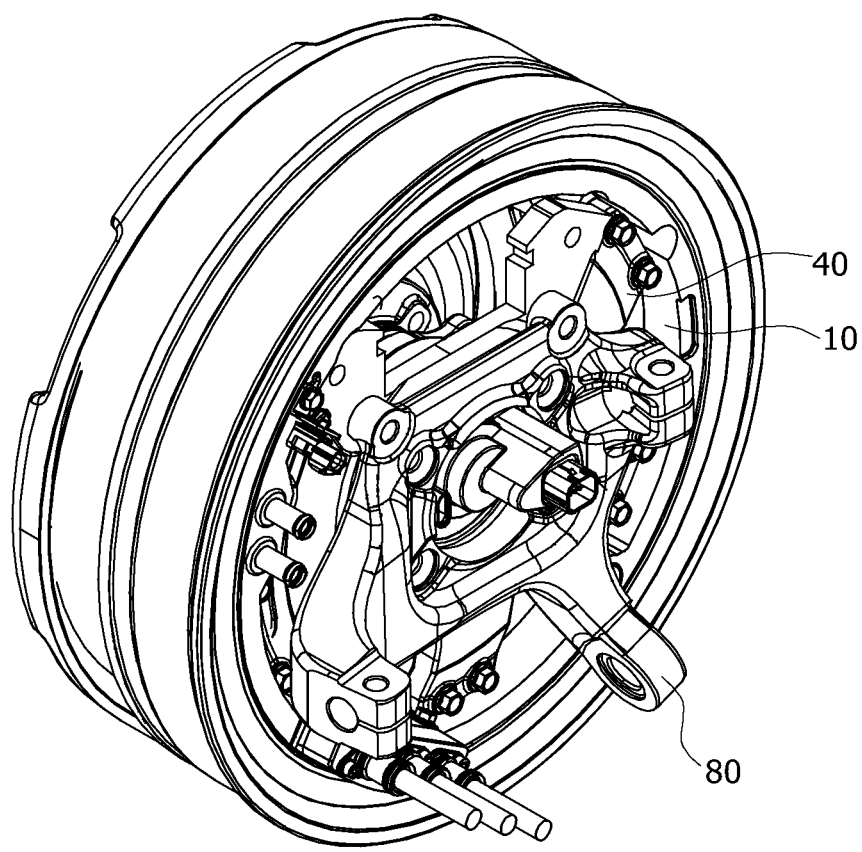
FIG. 5 is a diagram schematically illustrating that the bracket and a knuckle in accordance with the embodiment of the present disclosure are coupled to each other.

FIG. 3 is a diagram schematically illustrating the bracket in accordance with the embodiment of the present disclosure, FIG. 4 is a diagram schematically illustrating that the bracket and the stator in accordance with the embodiment of the present disclosure are coupled to each other, and FIG. 5 is a diagram schematically illustrating that the bracket and the knuckle in accordance with the embodiment of the present disclosure are coupled to each other. Referring to FIGS. 3 to 5, the bracket 40 in accordance with the embodiment of the present disclosure includes a body part 41, an extension part 42, and a mounting part 43.

The body part 41 may be formed in a ring shape with a hole formed in the center thereof. The knuckle 80 may be mounted on one surface of the body part 41, and the hub bearing part 70 may be mounted on the other surface of the body part 41.

The extension part 42 extend from the body part 41, and coupled to the stator 10. For example, the extension part 42 may be provided as a plurality of extension parts 42 which are formed along the circumference of the body part 41 and protrude in a lateral direction, and the plurality of extension parts 42 may each have an end bolted to the stator 10.

The mounting part 43 is formed on the body part 41, and the caliper 50 is coupled to the mounting part 43. More specifically, the mounting part 43 may include a mounting plate 431 and a mounting hole 432.

The mounting plate 431 is provided as a pair of mounting plates which are formed on the body part 41 and spaced apart from each other while facing each other. For example, the pair of mounting plates 431 may protrude from the top of the body part 41. The mounting plate 431 may be integrated with the body part 41. For improvement in hardness, the mounting plate 431 may be integrated with the body part 41 and the extension part 42.

The mounting hole 432 is formed in each of the mounting plates 431, and induces the coupling of the caliper 50. For example, the mounting hole 432 may be disposed on the same line as a driving shaft of the caliper 50 or disposed adjacent to the driving shaft of the caliper 50, which makes it possible to suppress the generation of rotational moment when the caliper 50 is operated.

The mounting part 43 in accordance with the embodiment of the present disclosure may further include a mounting guide 433. The mounting guide 433 is formed in each of the mounting plates 431, and guides the linear movement of the caliper 50. For example, the mounting guide 433 may be formed at a lateral end of the mounting plate 431, and have a groove shape into which the caliper 50 can be inserted. As a portion of the caliper 50 is placed on the mounting guide 433, it is possible to reduce the operation load of the caliper 50 while reducing the size of the caliper 50. The mounting guide 433 may support operation torque of the caliper 50.

Figure 6:
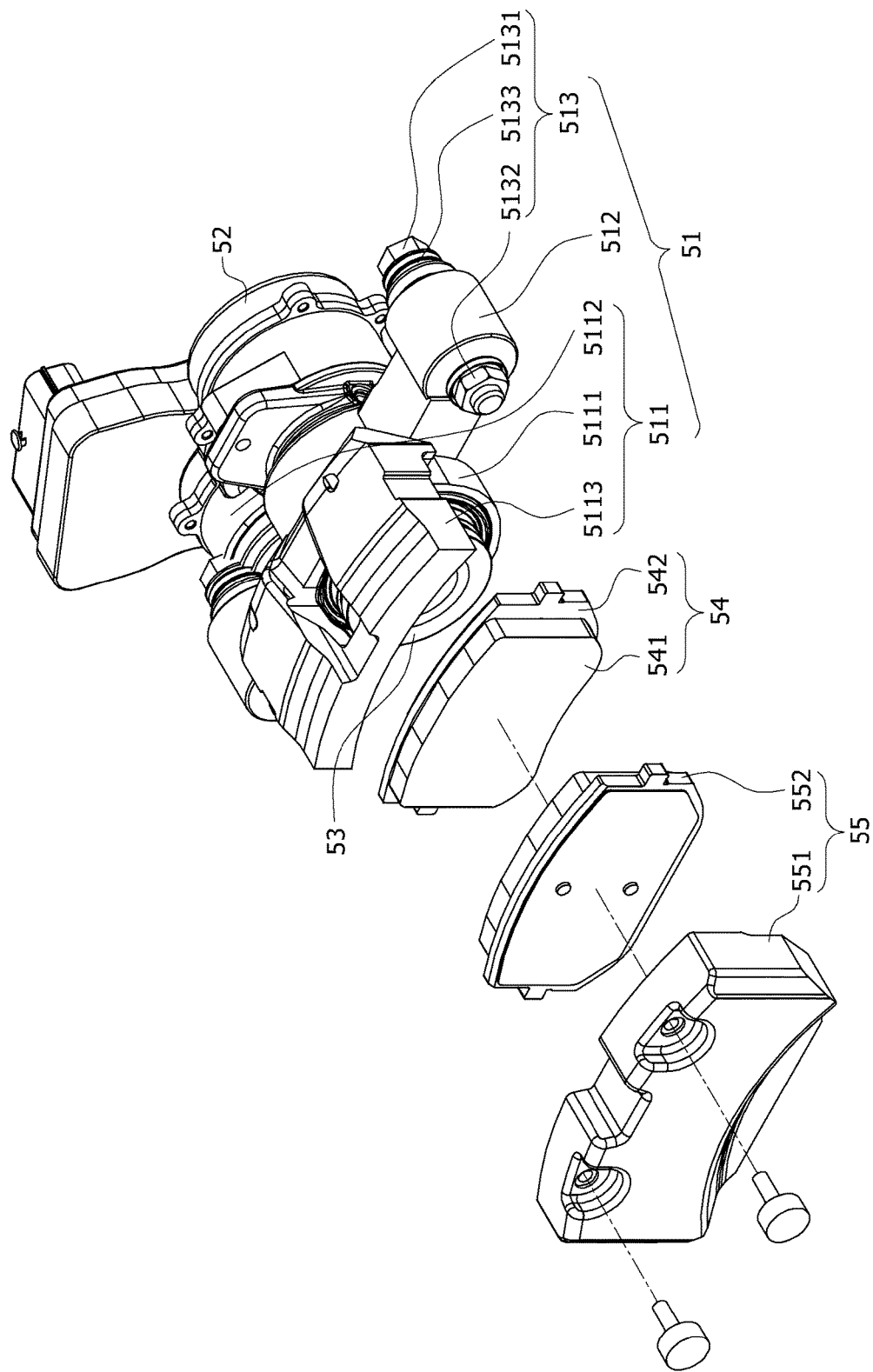
FIG. 6 is a perspective view schematically illustrating a caliper in accordance with the embodiment of the present disclosure.
Figure 7:
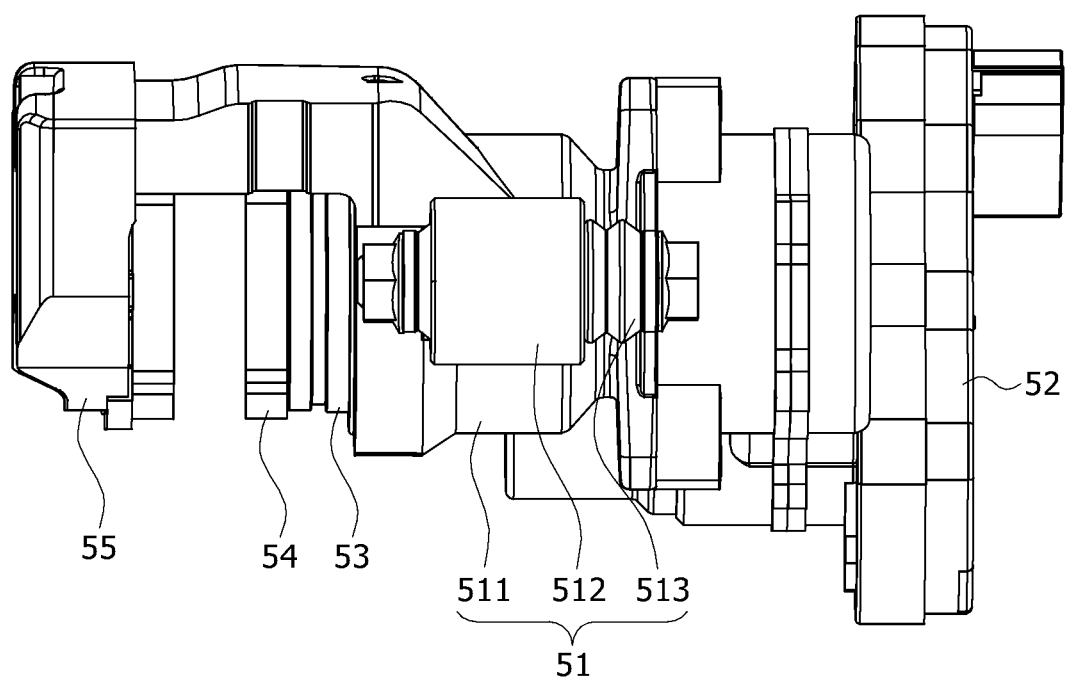
FIG. 7 is a side view schematically illustrating the caliper in accordance with the embodiment of the present disclosure.
Figure 8:
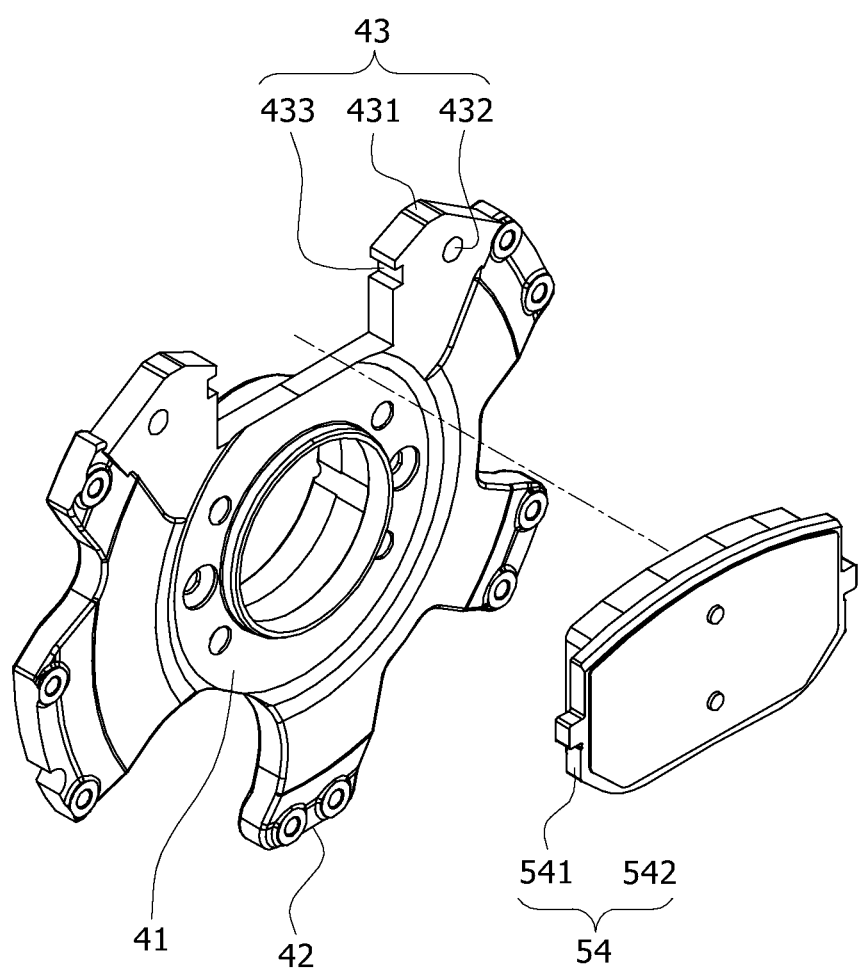
FIG. 8 is a diagram schematically illustrating a caliper inner pad in accordance with the embodiment of the present disclosure.
Figure 9:
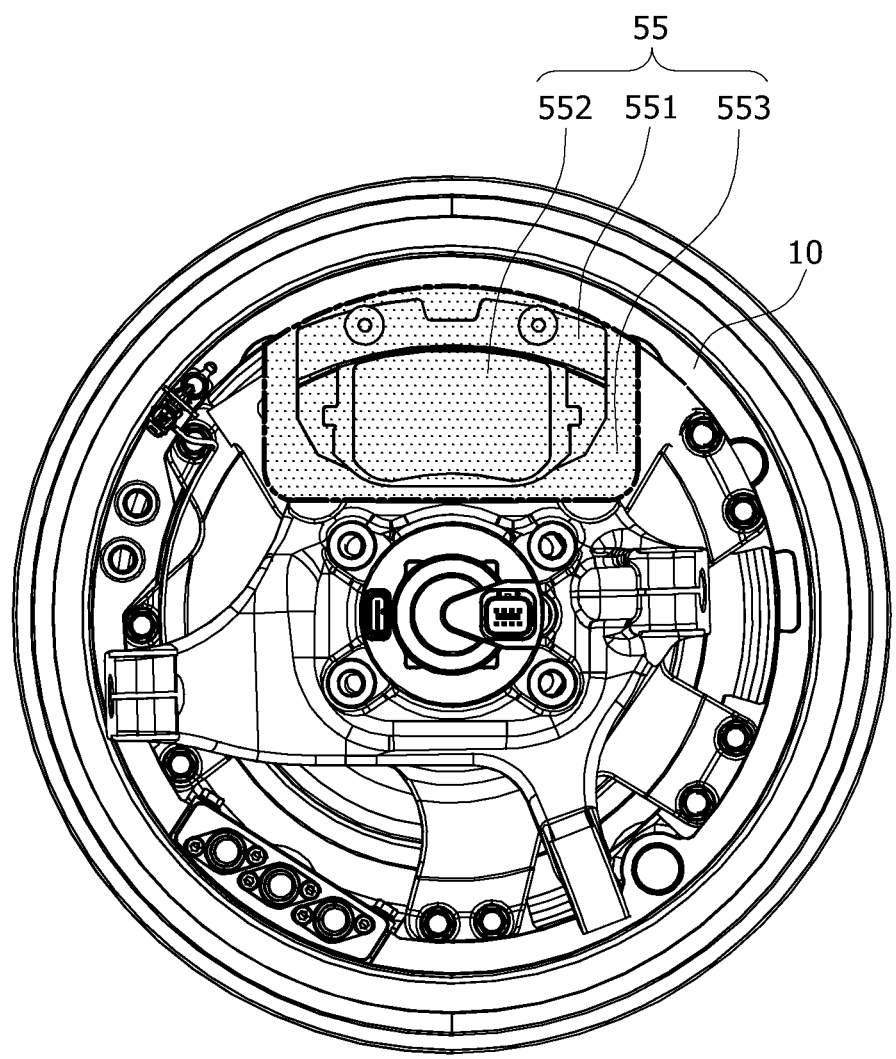
FIG. 9 is a diagram schematically illustrating that a caliper outer pad in accordance with the embodiment of the present disclosure is supported by the stator.

FIG. 6 is a perspective view schematically illustrating the caliper in accordance with the embodiment of the present disclosure, FIG. 7 is a side view schematically illustrating the caliper in accordance with the embodiment of the present disclosure, FIG. 8 is a diagram schematically illustrating a caliper inner pad in accordance with the embodiment of the present disclosure, and FIG. 9 is a diagram schematically illustrating that a caliper outer pad in accordance with the embodiment of the present disclosure is supported by the stator. Referring to FIGS. 6 to 9, the caliper 50 in accordance with the embodiment of the present disclosure includes a caliper housing 51, a caliper driver 52, a caliper piston 53, a caliper inner pad 54, and a caliper outer pad 55.

The caliper housing 51 is coupled to the bracket 40. For example, the caliper housing 51 may have protruding portions formed at both sides thereof and coupled to the bracket 40, and may be slid at the coupled portions by an external force.

The caliper driver 52 is mounted on the caliper housing 51, and provides a driving force. For example, the caliper driver 52 may be assembled to the caliper housing 51 or embedded in the caliper housing 51. The caliper driver 52 may be operated by hydraulic pressure or an electric motor, when receiving a brake pedal signal.

The caliper piston 53 is embedded in the caliper housing 51, and moved by the caliper driver 52. For example, the caliper piston 53 may be embedded in the caliper housing 51, and moved in one direction by the caliper driver 52 so as to operate the caliper inner pad 54.

The caliper inner pad 54 is moved by the caliper piston 53, and presses one surface of the disk 30. The caliper inner pad 54 may be connected to the caliper piston 53, or supported and operated by the bracket 40.

The caliper outer pad 55 is mounted on the caliper housing 51, and presses the other side of the disk 30 as the caliper housing 51 is moved. For example, the caliper housing 51 may be moved backward by a reaction force to a force which is generated by the forward movement of the caliper piston 53 and pushes the caliper inner pad 54, such that the caliper outer pad 55 can provide a braking force to the disk 30.

The caliper housing 51 in accordance with the embodiment of the present disclosure includes a housing body part 511, a housing extension part 512, and a housing support part 513.

The housing body part 511 has the caliper piston 53 embedded therein. For example, the housing body part 511 may include a first body 5111 having the caliper piston 53 embedded therein to induce linear movement, a second body 5112 formed on a rear surface of the first body 5111 and having the caliper driver 52 mounted thereon, and a third body 5113 extending from a front surface of the housing body part 511 and connected to the caliper outer pad 55.

The housing extension part 512 extends from either side of the housing body part 511. For example, the housing extension part 512 may extend from either side of the first body 5111, and have a hole corresponding to the mounting hole 432.

The housing support part 513 connects the housing extension part 512 and the bracket 40, and induces the sliding movement of the housing extension part 512. For example, the housing support part 513 may include a first support 5131 extending through the housing extension part 512 and the bracket 40, a second support 5132 coupled to an end of the first support 5131 through a nut, and a third support 5133 connected to the housing extension part 512 and the first support 5131, formed in a corrugated shape such that the length thereof can be adjusted, and configured to block an inflow of foreign matters.

The caliper inner pad 54 is supported by the bracket 40. For example, the caliper inner pad 54 may be mounted on the mounting part 43 and moved by the pressing of the caliper piston 53, and press the disk 30. The caliper inner pad 54 may include an inner frame part 541 disposed between the pair of mounting plates 431 and inserted into the mounting guide 433, and an inner pressing part 542 mounted in the inner frame part 541 and brought into direct contact with the disk 30. Such a caliper inner pad 54 may be returned to the original position thereof when an external force is removed by a restoration unit installed on the mounting part 43.

The caliper outer pad 55 in accordance with the embodiment of the present disclosure includes an outer plate part 551 and an outer pad part 552.

The outer plate part 551 is connected to the caliper housing 51. For example, the outer plate part 551 may be bolted to the third body 5113. The outer pad part 552 is assembled to the outer plate part 551, and brought into direct contact with the disk 30.

The caliper outer pad 55 may further include an outer support part 553. The outer support part 553 is mounted on the stator 10, and supports the outer plate part 551. For example, the outer support part 553 may have a shape into which the outer plate part 551 can be inserted and moved, and support the outer plate part 551 to relieve a load burden of the caliper. When an external force is removed by the restoration unit installed on the outer support part 553, the outer plate part 551 may be returned to the original position thereof.

Hereafter, an assembling process and an operation of the braking device for an in-wheel motor in accordance with the embodiment of the present disclosure, which has the above-described structure, will be described as follows.

The knuckle 80 is mounted on one surface of the body part 41, and the hub bearing part 70 is mounted on the other surface of the body part 41. The extension part 42 protruding laterally from the body part 41 is mounted on the stator 10, and the caliper 50 is mounted on the mounting part 43 integrated with any one or more of the body part 41 and the extension part 42.

The caliper 50 includes the caliper housing 51 mounted on the mounting part 43, the caliper driver 52 installed in the caliper housing 51 and configured to provide power, the caliper piston 53 embedded in the caliper housing 51 and moved by the caliper driver 52, the caliper inner pad 54 configured to come into contact with one surface of the disk 30 by the caliper piston 53, and the caliper outer pad 55 configured to come into contact with the other surface of the disk 30.

Since the caliper inner pad 54 is supported by the pair of mounting parts 43, the reduction in load of the caliper 50 can be induced, and the degree of freedom in installation of the caliper 50 can be improved. The caliper outer pad 55 may be connected to the caliper housing 51, and supported by the outer support part 553 mounted on the stator 10, if necessary, thereby inducing the reduction in load of the caliper 50.

In the above-described state, when a pedal operation signal is received, the caliper driver 52 is driven to push the caliper inner pad 54 on which the caliper piston 53 is supported by the bracket 40. Thus, the caliper inner pad 54 is pressed against the disk 30 and provides a braking force. As the caliper housing 51 is moved by a reaction force to the operation of the caliper piston 53, the caliper outer pad 55 is pressed against the disk 30 and provides a braking force.

In the braking device 1 for an in-wheel motor in accordance with the embodiment of the present disclosure, the knuckle 80 is mounted on the central portion of the bracket 40, the edge of the bracket 40 is coupled to the stator 10, and the caliper 50 is mounted on the bracket 40. The caliper 50 is partially supported by the bracket 40, which makes it possible to reduce the weight and size of the caliper 50. Furthermore, when both sides of the caliper 50 are mounted on the bracket 40, a height difference between a fixed line and an operation line of the caliper 50 may be reduced to suppress the generation of rotational moment. Furthermore, since the caliper 50 is mounted on the bracket 40, it is possible to measure runout in units of chassis modules.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A braking device for an in-wheel motor, comprising:
a stator;
a rotor configured to rotate when power is applied to the stator;
a disk interlocked with the rotor;
a bracket coupled to the stator and a knuckle; and
a caliper mounted on the bracket, and configured to press the disk,
wherein the bracket comprises:
a body part to which the knuckle is coupled;
one or more extension parts extending from the body part and coupled to the stator; and
a mounting part disposed on the body part, and having the caliper coupled thereto.

2. The braking device of claim 1, wherein the caliper comprises:
a caliper housing coupled to the bracket;
a caliper driver mounted on the caliper housing, and configured to provide a driving force;
a caliper piston embedded in the caliper housing, and moved by the caliper driver;
a caliper inner pad moved by the caliper piston so as to press one surface of the disk; and
a caliper outer pad mounted on the caliper housing, and configured to press another surface of the disk as the caliper housing is moved.

3. The braking device of claim 2, wherein the caliper outer pad comprises:
an outer plate part connected to the caliper housing; and
an outer pad part assembled to the outer plate part, and configured to come into contact with the disk.

4. The braking device of claim 3, wherein the caliper outer pad further comprises an outer support part mounted on the stator and configured to support the outer plate part.

5. The braking device of claim 2, wherein the caliper housing comprises:
a housing body part having the caliper piston embedded therein;
a housing extension part extending from either side of the housing body part; and
a housing support part configured to connect the housing extension part and the bracket and to induce sliding movement of the housing extension part.

6. The braking device of claim 2, wherein the caliper driver moves the caliper piston through hydraulic pressure or an electric motor.

7. The braking device of claim 2, wherein the caliper inner pad is supported by the bracket.

8. The braking device of claim 1, wherein the mounting part comprises:
a pair of mounting plates disposed on the body part, and spaced apart from each other while facing each other; and
a mounting hole formed in each of the pair of mounting plates, and configured to induce a coupling of the caliper.

9. The braking device of claim 8, wherein the mounting part further comprises a mounting guide formed on each of the pair of mounting plates, and configured to guide linear movement of the caliper.

10. The braking device of claim 8, wherein each of the pair of mounting plates is formed as one body with a respective one of the one or more extension parts.

* * * * *